US006664468B2

(12) United States Patent
Jarasse et al.

(10) Patent No.: US 6,664,468 B2
(45) Date of Patent: Dec. 16, 2003

(54) MODULAR ELECTRICAL APPLIANCES AND HOUSING COMPRISING SAME

(75) Inventors: Jean-Luc Jarasse, Limoges (FR); Gérard Tarrade, Limoges (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 09/937,818

(22) PCT Filed: Jan. 30, 2001

(86) PCT No.: PCT/FR01/00282

§ 371 (c)(1),
(2), (4) Date: Dec. 27, 2001

(87) PCT Pub. No.: WO01/57897

PCT Pub. Date: Aug. 9, 2001

(65) Prior Publication Data

US 2002/0153152 A1 Oct. 24, 2002

(30) Foreign Application Priority Data

Jan. 31, 2000 (FR) .......................................... 00 01198

(51) Int. Cl.[7] .............................................. H02G 3/08
(52) U.S. Cl. ........................................ 174/50; 174/52.1
(58) Field of Search .......................... 174/50, 52.1, 54, 174/59, 65 R, 53; 455/90, 575, 347, 351; 379/428.01; 385/89, 88, 93, 94, 14, 131

(56) References Cited

U.S. PATENT DOCUMENTS 4,161,651 A 7/1979 Sano et al.
4,959,874 A * 9/1990 Saruta et al. ............... 359/114
5,349,461 A * 9/1994 Huynh et al. .............. 359/136
5,362,961 A * 11/1994 Hamanaka .................. 359/435
5,424,859 A * 6/1995 Uehara et al. ................ 455/90
5,440,654 A * 8/1995 Lambert, Jr. ................. 385/17
5,563,728 A * 10/1996 Allen et al. ................. 359/172
5,621,913 A * 4/1997 Tuttle et al. .................. 455/90
5,754,948 A * 5/1998 Metze .......................... 455/90
6,121,545 A * 9/2000 Peng et al. ............ 174/35 GC
6,351,592 B1 * 2/2002 Ehn et al. ................. 174/65 R

FOREIGN PATENT DOCUMENTS

DE 298 00 372 U1 4/1998

* cited by examiner

*Primary Examiner*—Dean A. Reichard
*Assistant Examiner*—Angel R. Estrada
(74) *Attorney, Agent, or Firm*—Young & Thompson

(57) ABSTRACT

A housing (1) designed to contain an assembly of modular electrical appliances mounted on a support (12, 14), whereof at least the first modular electrical appliance provided with data transmitters (36) and at least a second modular electrical comprising data receivers (42) enabling wireless communication from the first appliance to the second appliance. When the modular appliances are mounted in operating position, the data transmitters (36) of the first appliance are oriented opposite a surface of walls (2–8) of the housing. The data receivers can also be oriented opposite a wall surface of the housing.

18 Claims, 2 Drawing Sheets

MODULAR ELECTRICAL APPLIANCES AND HOUSING COMPRISING SAME

BACKGROUND OF THE INVENTION

The present invention relates to modular electrical devices and more particularly to devices which are grouped in a common housing and which need to communicate with each other. In the present context the term "housing" refers to any kind of case, cabinet or other enclosure able to integrate a plurality of modular electrical devices.

The modular electrical devices can have many different functions in a domestic or industrial electrical installation. Examples include control stations, circuit-breakers, relays, meters, switches, etc. In the case of some such devices, it is necessary for at least one of them to be able to communicate data to at least one other modular electrical device. This is the case, for example, if the housing includes a centralized control device for actuating various functions of the various modular electrical devices in the housing, depending on the time of day, power distribution conditions or any other parameters. To this end, at least some of the modular electrical devices must exchange data. The data is generally in the form of digital signals coded in accordance with a predefined protocol.

FIG. 1 shows diagrammatically a housing 1 designed to accommodate an assembly of modular electrical devices. In this example it is a cabinet made from sheet metal or plastics material and has a back wall 2, two lateral walls 4*a* and 4*b*, a base 6, a top 8 and a door 10 facing the back wall 2 and which can completely close the cabinet 1. Depending on the configuration of the housing 1, the door 10 can be replaced by a series of doors, each enabling partial opening of the housing, or by one or more removable cover plates.

Toward the back 2 of the cabinet 1 is a fixed structure forming a support for the modular electrical devices. In this example, it is made up of uprights 12 against the lateral walls 4*a* and 4*b*. A plurality of horizontal rails 14 are fixed to the uprights 12. The rails 14 are shaped to retain the modular electrical devices in a removable manner. The modular electrical devices can then be mounted arbitrarily on the structure 12, 14.

In the conventional way, data is communicated between modular electrical devices by connecting cables. It is then necessary to provide, for each transmission channel, a cable that connects a port of one module to that of another module.

In some applications, installing such wiring is complex. The wiring can also occupy a large space around the devices and require considerable wiring and maintenance time.

Also, the cables are exposed to electrical interference, which can be at very high levels, and in some case impede or even prevent the correct transmission of information.

To alleviate the above drawbacks, it has already been proposed to use wireless links for communication between the various devices, generally by means of infra-red beams. This exploits the fact that a sender of one device can be aimed directly at a receiver of another device.

For example, some prior art modular electrical devices are installed side by side on the same rail. The devices have an infra-red sender on one side and a receiver on the other side. Accordingly, when they are grouped side by side, the sender of one if in direct view of the receiver of the other. In this way, infra-red information can be transmitted along a row of devices on the same rail. Depending on the application, the devices merely serve as a repeater if the information is not addressed to them. If the information is addressed to them, they execute an action.

To enable messages to be sent to another rail above or below it, an optical-electrical converter is provided at the end of the rail. There is then a wired connection to an electrical-optical converter at the end of the adjacent rail. Note that this system can operate only in a compact group; in other words each device is a link in a transmission chain.

Other prior art electrical devices, in particular surge arresters, employ an optical surveillance system. When the devices are mounted on their support, they conjointly form a conduit, each having a hole through it forming one section of the conduit, so that the set of components constitutes an optical tunnel. A light emitting device is provided at one end and a device for receiving that light is provided at the other end. If a fault occurs in one of the devices, means for blocking the optical conduit are activated to break the optical link. Thus absence of the optical signal at the receiver indicates that at least one of the devices is inoperative.

There are also systems that use an optical signal to communicate the operating status of one or more supervised electrical devices. For example, the document WO-A-9905761 describes an overvoltage protection device equipped with an autodiagnostic unit connected by means of an opto-isolator to a communication device. Optical data can therefore be transmitted via the opto-isolator in the event of an incident and relayed to a remote point via a telecommunication line in the form of electrical signals.

Note that if optical or infra-red beams are used to provide the link, they always take a linear and confined path. As a result, if several devices are to be able to communicate, they must on the one hand be equipped with signal relays and on the other hand be located on a specific optical path.

These requirements constitute a constraint, especially when it is a question of installing modular electrical devices in a housing in a given configuration.

SUMMARY OF THE INVENTION

Given the above problems of the prior art, the present invention proposes a housing containing a set of modular electrical devices mounted on supports and including at least one first modular electrical device provided with data sender means and at least one second modular electrical device including data receiver means, enabling wireless link communication from the first device to the second device. When the modular electrical devices are mounted in their operating position, the data sender means of the first device face a surface of walls of the housing.

It is therefore clear that the path of the signals from the sender means to the receiver means entails at least one reflection from at least one inside wall of the housing.

The application has discovered, surprisingly, that the signal sent does not have to be conveyed along a specified path to the receiver means of another module because the inside walls of the housing provide an adequate reflector for distributing the beams.

When the modular electrical devices are mounted in their operating position, the data receiver means of the second device advantageously also face a surface of the walls of the housing.

The wireless link can be an infra-red link. It can be provided by one or more light-emitting diodes (LED) and receiver photodiodes routinely used in the field of remote controllers.

It has been found that with this arrangement the inside walls of the housing 1—and especially that of the back 2—act as a sufficiently effective reflector to distribute a beam coming from a sending device to the receiver means of all the other devices in the housing, whether the latter are on the same rail or on another rail.

In a preferred embodiment of the invention, in which the housing has at least one part providing access to the interior and in that, when they are in their operating position, the data sender means and the data receiver means face surfaces of walls that are not in said part providing access to the interior. In this way, it is possible to provide the normal links between the modular electrical devices even when the housing is "open". A portion providing access to the interior can be a door, a cover plate, an access hatch or any other equivalent device.

When the modular electrical devices are in their operating position, the data sender means and the data receiver means preferably face the same inside face of the housing.

When the modular electrical devices are in their operating position, the data sender means and the data receiver means are advantageously oriented to obtain an internal reflection at the surface opposite said part providing access to the interior.

The housing can be equipped with support means, for example rails 14 as described with reference to FIG. 1, for removably fixing said first and second modular electrical devices in a plane and in an arbitrary manner, a first modular electrical device being able to transmit to at least one second modular electrical device at any location in said plane.

The invention provides the considerable advantage of being able to place the modular electrical devices at the locations most propitious to their respective function without worrying about providing a wired or wireless link that must comply with a specified alignment.

The invention also relates to a modular electrical device specifically intended for the aforementioned housing and having on the same face means for mounting it in said housing and wireless data sender and/or receiver means.

The invention finally provides a modular electrical device specifically intended for the aforementioned housing and having wireless data sender and/or receiver means on the top or bottom face.

BRIEF DESCRIPTION OF THE DRAWINGS

Other advantages and features of the invention will become more clearly apparent on reading the following description of a preferred embodiment of the invention, which description is given by way of non-limiting example only and with reference to the accompanying drawings, in which.

DESCRIPTION OF THE PREFERRED EMBODIMENTS

Figure 1:
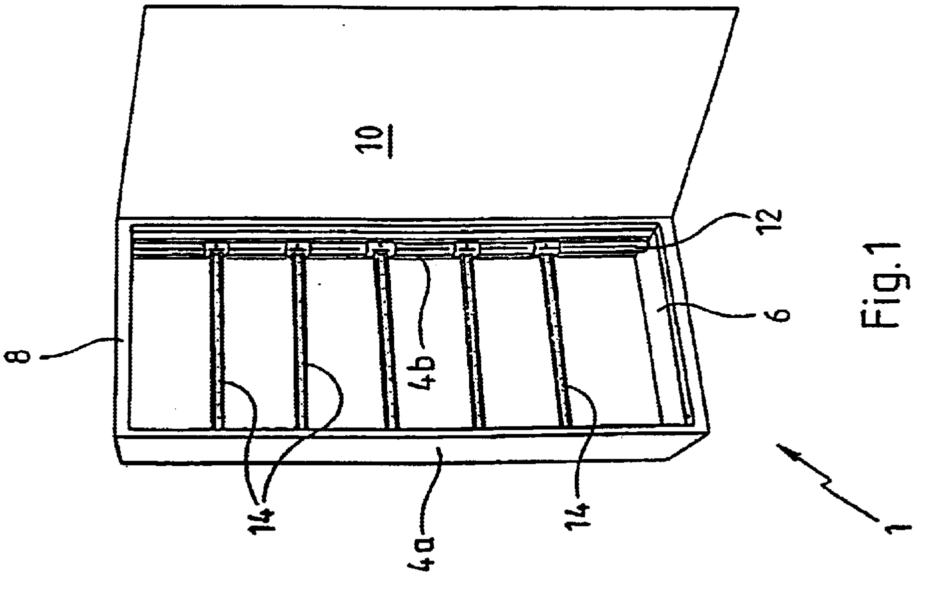
FIG. 1, already described, is a diagrammatic view of a housing in which modular electrical devices can be mounted.

In the following description, the term "front" refers to parts and faces that face toward the door 10 and the term "rear" refers to parts and faces that face toward the back 2 of the housing (see FIG. 1).

Figure 2:
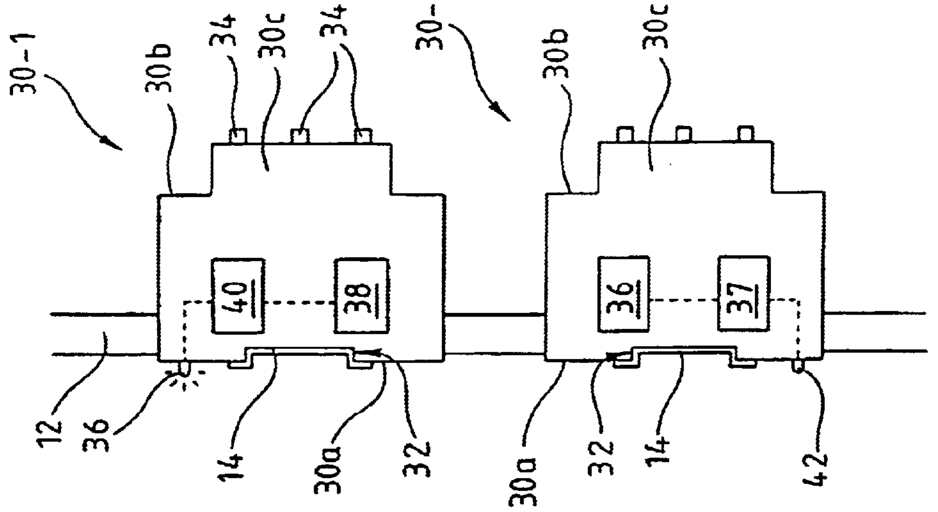
FIG. 2 is a diagrammatic side view of two modular electrical devices in accordance with the present invention mounted on their support.

FIG. 2 is a simplified view of two modular electrical devices 30-1 and 30-2, referred to hereinafter as "modules", providing wireless data transmission in accordance with the present invention. In the conventional way, each module 30-1 and 30-2 has on its rear part 30*a* a cavity 32 for mounting it on a rail 14 inside the housing 1. The front face 30*b* of the module has a part 30*c* forming its "nose". The nose 30*c* carries interface means 34 accessible when the door 10 is open. The interface means 34 can consist of control buttons, indicators, display devices, etc.

The module 30-1 has on its rear face 30*a*, facing toward the back wall 2, a light-emitting diode 36 for emitting infra-red signals to other modules. The signals come from a central unit 38 which controls all functions of the module 30-1 and are sent to a data transmitter unit 40. The latter converts the data to be transmitted from the central unit 38 into control signals in the form of electrical pulses in accordance with a predetermined code. Those pulses are transmitted to the diode 36, which emits infra-red signals corresponding to the data.

The technique of transmitting commands via a light-emitting diode is well known in itself and for conciseness is not described here.

The diode 36 is on the rear face 30*a* of the module, at a short distance, of the order of 10 to 50 mm, from the back wall 2 of the housing, so that the infra-red beam emitted is diffused over a portion of the surface of the back wall 2. Note that a light-emitting diode 36 generally emits omnidirectionally, and therefore some rays may also reach other walls 4 to 8 of the housing, and in particular the side walls 4*a* to 4*b*.

Each light-emitting diode 36 can be associated with an optic (not shown) enabling it to diffuse over a very wide range of angles, in order to improve the distribution of the signals sent to the walls 2 to 8 of the housing 1.

The module 30-2 has on its rear face 30*a* receiver means in the form of one or more photodiodes 42. The photodiode 42 is turned to the light-emitting diode 36 of the module 30-1 in order to be able to detect its signals. The photodiode 42 is connected to a data receiver unit 37 in turn connected to the central unit 36 in order to transmit thereto the various signals received.

The photodiodes 42 are advantageously mounted on a well exposed part of the rear face 30*a* of the module to receive signals emanating at various angles from the walls 2 to 8 of the housing 1. The photodiodes 42 are preferably mounted outside shadow areas that may be created by the supports on which the modules 30-1 and 30-2 are mounted.

The photodiodes 42 can be associated with optics (not shown) enabling them to capture radiation over a very wide range of angles.

Figure 3:
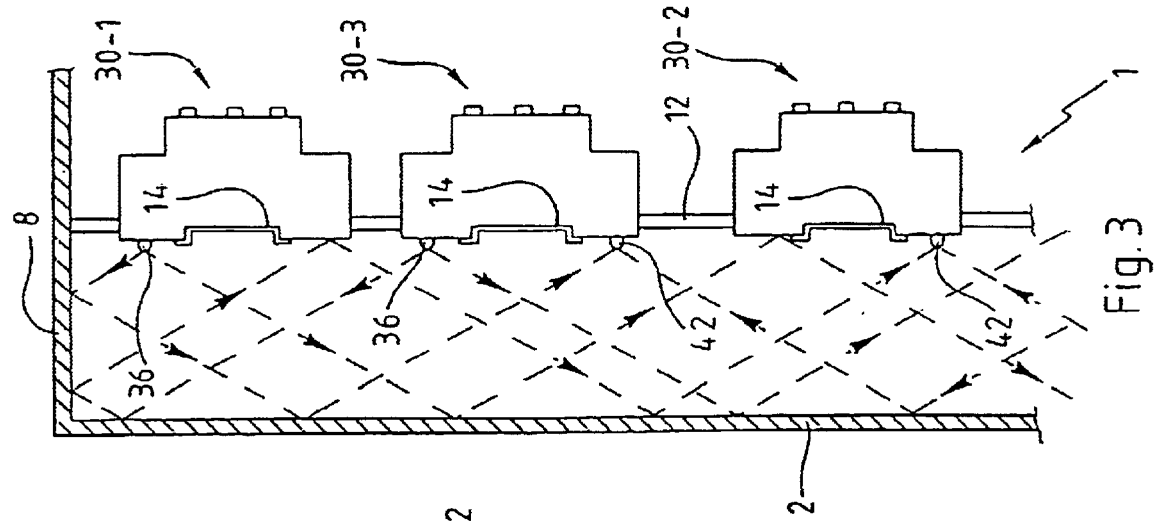
FIG. 3 is a diagrammatic partial side view of another set of modular electrical devices mounted in the FIG. 1 housing, in which view the path of some infra-red rays is shown.

FIG. 3 is a diagrammatic partial view of another set of modules including, in addition to the modules 30-1 and 30-2, a combined sender/receiver module 30-3, its central unit being connected both to a data transmitter unit connected to the diode 36 and to a data receiver unit connected to the diode 42. In this example, three modules are mounted one under the other in the housing 1. Other similar modules that can be seen in FIG. 4 are also mounted below and beside those shown.

The rays (shown in dashed line in FIG. 3) directed onto the walls 2 to 8 by the light-emitting diodes 36 are reflected in all directions, especially by the back wall 2, but also by the side walls 4a and 4b, and partly by the top 8 and the base 6 if these are also reflective.

Figure 4:
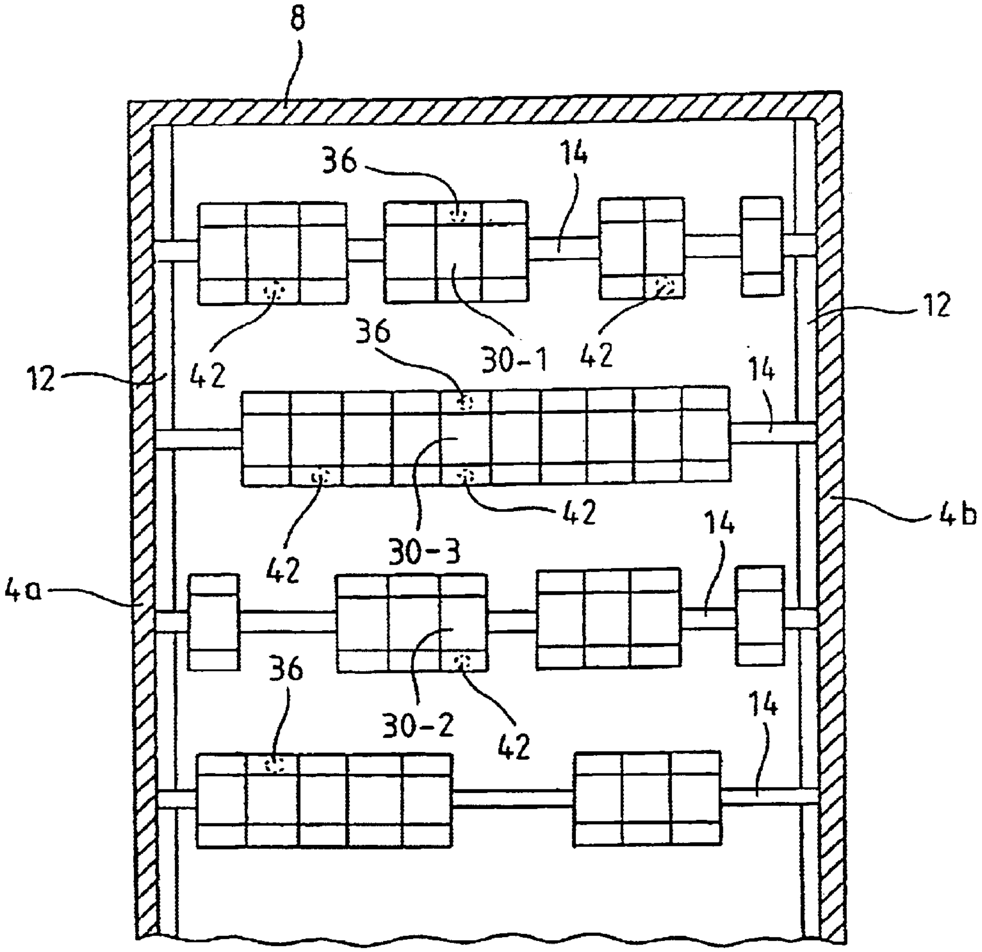
FIG. 4 is a front view of this set of modular electrical devices.

In the example shown in FIGS. 3 and 4, only the modules 30-1 and 30-3 are equipped with sending means, in this example the light-emitting diode 36. On the other hand, only the modules 30-2 and 30-3 are equipped with receiver means 42 like those described above. In other words, the module 30-1 is a sender module, i.e. a "master" module, the module 30-3 is merely a receiver module, i.e. a "slave" module, and the module 30-3 is a combined module.

If one of the master sender modules 30-1 or 30-3 must transmit, its light-emitting diode 36 is activated under the control of the circuits 38 and 40 and in accordance with a particular protocol. The infra-red signals emitted undergo multiple reflections against the walls 2 to 8 of the housing so that all the rear faces 30a—and therefore all the photodiodes 42—of all the modules in the housing 1 receive the signal sent, with adequate intensity. In this way the photodiode 42 of all the modules in the housing 1 can detect and decode a message coming from another module emitted by a light-emitting diode 36. Note that the light-emitting diodes and/or the photodiodes being oriented toward the wall 2 of the housing 1, the door 10 (or other equivalent access means) can remain open without impeding the transmission of signals. The door 10 has its back to the light-emitting diodes 36 and the photodiodes 42 and therefore hardly contributes at all to the retransmission of signals.

In practice, if the housing is made of metal, the inside surfaces of the walls are sufficiently reflective to achieve a good distribution of the signals (which are infra-red signals in this instance) over the whole of the space occupied by the modules.

The same applies to housings made of plastics materials and most other materials used in this art. If necessary, a reflective coating can be provided on the inside face of at least one wall, in particular the back wall 2. The coating can take the form of a reflective panel against the wall or walls concerned, for example, or a reflective layer applied to it or them.

A sender module 30-1 or 30-3 can transmit a message to all the modules or to one of them or to a group of them. The transmission protocols enabling this selective transmission are well known and are therefore not described in detail. For example, each module can have its own address and the sender module initially transmits an address or a series of addresses followed by a message to be sent to those addresses. The message can be a command to actuate various devices internal to the modules, such as switches or indicator lamps, or a signal conveying information necessary for the operation of the module or modules concerned.

The signals coming from a sender module 30-1 or 30-2 are captured by the photodiodes 42 of the modules 30-2 and 30-3. Depending on the addresses detected, each module can determine if the message transmitted concerns it or not.

Because it is only a receiver, the module 30-2 cannot transmit acknowledgement messages. As a general rule, slave modules are simple devices. Likewise the module 30-1, which cannot receive acknowledgement messages. The invention does not require each module also to serve as a repeater, as in the case of some prior art systems. These simple devices (switches, relays, etc.) can therefore be inexpensive.

For example:

the sender means can be a diode emitting at a wavelength of 950 nanometers (nm), at a power of 40 milliwatts per steradian (mW/sr) within an emission angle from 90° to 150°, for example 120°, as shown in FIG. 3, emission being pulsed to maximize the range with acceptable power; and the receiver means can be a diode with built-in amplification and having high immunity to ambient light, tuned to the same frequency (950 nm) and having a sensitivity from 0.2 to 0.4 milliwatt per square meter ($mW/m^2$), in this example 0.3 $mW/m^2$.

Note that, thanks to the invention, the positions of the modules relative to each other do not affect the possibilities of communication, whether the modules are on the same rail 14 or not. Modules can therefore be moved, rearranged, removed or added without requiring any rewiring or other measures to ensure module-to-module continuity for relaying messages.

Figure 5:
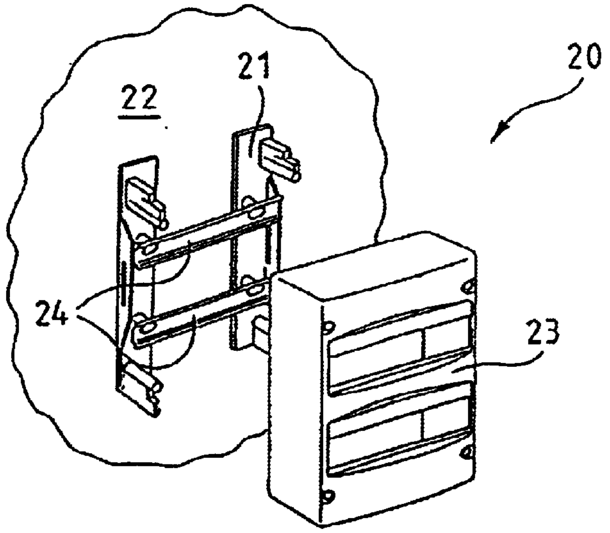
FIG. 5 is a perspective view of a different embodiment of the housing.

In the embodiment shown in FIG. 5, the housing is a cabinet 12 including a chassis 21 fixed to a wall 22 and a lid 23 fixed to the chassis 21, which includes two rails 24 similar to the rails 14 of the housing 1.

In this embodiment, the reflections occur directly at the wall 22, but if that wall is not sufficiently reflective, an appropriate plate can be fitted to it, for example a plate with apertures.

In an embodiment that is not shown, the diode or diodes is/are on the top or bottom face of the modules, not on the rear face.

Clearly the invention lends itself to many other embodiments that will be evident to the skilled person, whether this concerns the structure on which the modules are mounted, the transmission protocols or the technology of the sender and receiver means.

What is claimed is:

1. A housing containing plural electrical devices mounted don supports, the housing having interior surfaces, a first of the plural electrical devices having a data sending light emitting diode transmitting an infra-red signal, and a second of the plural electrical devices having a data receiving photodiode receiving the infra-red signal transmitted by the data sending light emitting diode, wherein the data sending light emitting diode faces one of the interior surfaces of the housing.

2. The housing of claim 1, wherein the data receiving photodiode faces one of the interior surfaces of the housing.

3. The housing of claim 2, wherein the data receiving photodiode and the data sending light emitting diode face a same one of the interior surfaces.

4. The housing of claim 1, wherein the housing includes a door providing access to the electrical devices and wherein the door is not the one interior surface faced by the data sending light emitting diode.

5. The housing of claim 4, wherein the data receiving photodiode and the data sending light emitting diode face one of the interior surfaces opposite the door.

6. The housing of claim 1, further comprising a support that removably fixes the first and second electrical devices in a plane, and wherein the data sending light emitting diode transmits the infra-red signal to the data receiving photodiode by reflecting the infra-red signal from the one of the interior surfaces of the housing.

7. The housing of claim 1, wherein the data sending light emitting diode emits the infra-red signal with an emission angle of 90° to 150°.

8. The housing of claim 1, wherein the first of the electrical devices does not include the data receiving photodiode.

9. The housing of claim 1, wherein the second of the electrical devices does not include the data sending light emitting diode.

10. The housing of claim 1, wherein the photodiode has a sensitivity of 0.2 to 0.4 $mW/m^2$.

11. A housing containing plural electrical devices mounted on supports, the housing having interior surfaces, a first of the plural electrical devices having data sending means for transmitting an infra-red signal, and a second of the plural electrical devices having data receiving means for receiving the infra-red signal transmitted by the data sending means, wherein the data sending means faces one of the interior surfaces of the housing, and wherein at least one of the first and second electrical devices has a face that includes (a) means for mounting the device in the housing and (b) at least of the data sending means and the data receiving means.

12. The housing of claim 11, wherein the face is a rear face of the at least one of the first and second electrical devices.

13. The housing of claim 11, wherein the face is one of a top and a bottom face of the at least one of the first and second electrical devices.

14. A housing containing plural electrical devices that communicate with each other, the housing comprising a generally flat interior surface that reflects infra-red signals and a support for the electrical devices, the support being spaced from the interior surface to leave a gap between the interior surface and the electrical devices mounted on the support, a first of the plural electrical devices being mounted on the support and comprising an infra-red signal transmitter that faces into the gap and transmits infra-red signals toward the interior surface of the housing, and a second of the plural electrical devices being mounted on the support and comprising an infra-red signal receiver that faces into the gap and receives the infra-red signals from the infra-red signal transmitter that have been reflected from the interior surface of the housing, wherein the first electrical device has a surface that is removably fixed to the support and on which the infra-red signal transmitter is mounted.

15. The housing of claim 14, wherein the interior surface is a rear wall of the housing.

16. The housing of claim 14, wherein some of the plural electrical devices are arranged in a group that includes one of the first electrical devices and plural ones of the second electrical devices.

17. The housing of claim 16, wherein the one of the first electrical devices in the group further comprises an infra-red signal receiver for receiving an infra-red signal from another one of the first electrical devices not in the group.

18. The housing of claim 1, wherein the first electrical device has a surface that is removably fixed to a support and on which the data sending light emitting diode is mounted.

* * * * *